US012418062B2

(12) United States Patent
Andruskiewicz, IV et al.

(10) Patent No.: US 12,418,062 B2
(45) Date of Patent: Sep. 16, 2025

(54) IMMERSION COOLING SYSTEMS DIRECTING COOLANT FLOW BETWEEN BATTERY CELLS AND COOLING COMPONENTS INTERNAL AND EXTERNAL TO BATTERY PACKS

(71) Applicant: GM GLOBAL TECHNOLOGY OPERATIONS LLC, Detroit, MI (US)

(72) Inventors: Peter Paul Andruskiewicz, IV, Ann Arbor, MI (US); Kristopher A. Thor, Novi, MI (US); Chih-hung Yen, Bloomfield Hills, MI (US); David R. Clark, Grosse Pointe Woods, MI (US); M. Saif Siddiqui, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 753 days.

(21) Appl. No.: 17/589,358

(22) Filed: Jan. 31, 2022

(65) Prior Publication Data

US 2023/0246266 A1 Aug. 3, 2023

(51) Int. Cl.
*H01M 10/6568* (2014.01)
*B60L 58/26* (2019.01)
(Continued)

(52) U.S. Cl.
CPC ......... *H01M 10/6568* (2015.04); *B60L 58/26* (2019.02); *H01M 10/613* (2015.04); *H01M 10/625* (2015.04); *H01M 10/63* (2015.04); *H01M 10/643* (2015.04); *H01M 10/6556* (2015.04); *H01M 10/6557* (2015.04); *H01M 10/6567* (2015.04); *H01M 50/213* (2021.01); *H01M 2220/20* (2013.01)

(58) Field of Classification Search
CPC ........... H01M 10/6568; H01M 10/613; H01M 10/625; H01M 10/63; H01M 10/643; H01M 10/6556; H01M 10/6557; H01M 10/6567; H01M 50/213; H01M 2220/20; B60L 58/26
See application file for complete search history.

(56) References Cited

U.S. PATENT DOCUMENTS 6,111,387 A * 8/2000 Kouzu ................ H01M 10/613 429/99
6,677,728 B2 * 1/2004 Takedomi ......... H01M 10/6555 320/112

(Continued)

*Primary Examiner* — Barbara L Gilliam
*Assistant Examiner* — Lawrence La Raia, III

(57) ABSTRACT

A battery pack is disclosed and includes battery cells, an outer housing, a support structure, and a planar structure. The outer housing is configured to enclose and immerse the plurality of battery cells in a coolant. The outer housing includes multiple walls including side walls, a top wall and a bottom wall. The support structure supports the battery cells. The support structure includes dividing members separating the battery cells. The planar structure is disposed above or below the battery cells. A gap exists between a planar surface of the planar structure and a planar surface of one of the top wall and the bottom wall of the outer housing for flowing the coolant between the planar structure and the one of the top wall and the bottom wall. The planar structure and at least some of the walls direct the coolant to flow across and between the battery cells.

18 Claims, 15 Drawing Sheets

1100
1102
1108

(51) Int. Cl.

| | |
|---|---|
| ***H01M 10/613*** | (2014.01) |
| ***H01M 10/625*** | (2014.01) |
| ***H01M 10/63*** | (2014.01) |
| ***H01M 10/643*** | (2014.01) |
| ***H01M 10/6556*** | (2014.01) |
| ***H01M 10/6557*** | (2014.01) |
| ***H01M 10/6567*** | (2014.01) |
| ***H01M 50/213*** | (2021.01) |

(56) References Cited

U.S. PATENT DOCUMENTS 7,766,544 B2 * 8/2010 Shibuya .................. B60L 58/25
374/208
2010/0099015 A1 * 4/2010 Kawai ............... H01M 10/6568
429/62
2018/0111443 A1 * 4/2018 Kim ................... B60H 1/00278
2020/0006827 A1 * 1/2020 Filter ................ H01M 10/6556
2020/0220132 A1 * 7/2020 Bourke ................... B60L 58/25
2021/0384567 A1 * 12/2021 Hom ................... H01M 10/647
2024/0053111 A1 * 2/2024 Jensen ..................... F01P 11/04

* cited by examiner 500
510
512
514
514
514
514
514
516
518
520
522
524
526

1200
1202
1204
1206
1208
1210
1211
1212

IMMERSION COOLING SYSTEMS DIRECTING COOLANT FLOW BETWEEN BATTERY CELLS AND COOLING COMPONENTS INTERNAL AND EXTERNAL TO BATTERY PACKS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery packs of electric vehicles.

An electric vehicle includes a battery pack that provides power to various vehicle systems including propulsion systems, lighting systems, infotainment systems, air-conditioning systems, braking systems, steering systems, autonomous control systems, navigation systems, etc. The propulsion system may include one or more motors for driving wheels of the vehicle.

A battery pack typically includes an outer housing that encloses the battery pack. Power is supplied from the battery pack through the housing to various vehicle systems and devices. A control circuit may be disposed on or external to the housing and monitor states of the battery pack and control supply of power to the vehicle systems.

SUMMARY

A battery pack is disclosed and includes battery cells, an outer housing, a support structure, and a planar structure. The outer housing is configured to enclose and immerse the battery cells in a coolant. The outer housing includes multiple walls including side walls, a top wall and a bottom wall. The support structure supports the battery cells. The support structure includes dividing members separating the battery cells. The planar structure is disposed above or below the battery cells. A gap exists between a planar surface of the planar structure and a planar surface of one of the top wall and the bottom wall of the outer housing for flowing the coolant between the planar structure and the one of the top wall and the bottom wall. The planar structure and at least some of the walls direct the coolant to flow across and between the battery cells.

In other features, the planar structure and the top wall direct the coolant across tops of the battery cells prior to or subsequent to flowing between the battery cells.

In other features, the planar structure and the bottom wall direct the coolant across bottoms of the battery cells prior to or subsequent to flowing between the battery cells.

In other features, the planar structure is configured as a splitter and receives coolant and splits the received coolant into flow paths to direct the coolant around sides of each of the battery cells.

In other features, the planar structure directs the coolant to flow vertically between and around each of the battery cells.

In other features, the planar structure is configured as a manifold and receives coolant from each of the battery cells and direct the coolant to the gap between the planar structure and the one of the top wall or the bottom wall.

In other features, the battery pack further includes an electrical bus disposed across and electrically coupled to the battery cells. The support structure is configured to hold the electrical bus. The support structure is configured to direct the coolant across a surface of the electrical bus.

In other features, the planar structure includes holes for passage of the coolant to flow to or from each of the battery cells. The support structure includes feet, where open areas between the feet are respectively over the holes for passage of the coolant to flow to or from each of the battery cells.

In other features, gaps between the feet allow the coolant to flow between the feet and along sides of the battery cells.

In other features, the planar structure includes first holes for passage of the coolant to flow to or from each of the battery cells. The support structure includes second holes. The first holes are larger than the second holes. Portions of the support structure including the second holes are disposed within the first holes.

In other features, the support structure includes orifices are arranged for flow of the coolant to or from the battery cells. Each portion of the support structure surrounding a respective one of the orifices is formed of a material that melts during a thermal runaway event of a corresponding one of the battery cells.

In other features, the battery pack further includes the support structure including protruding elements extending in gaps between the battery cells.

In other features, the protruding elements include at least one of spiral-shaped elements, disks, rods, or trees.

In other features, a cooling system is disclosed and includes a battery pack, a pump, and a control module. The pump is configured to pump coolant to and from the battery pack. The control module is configured to control the pump to circulate the coolant through the battery pack.

In other features, a cooling system is disclosed and includes: the battery pack; at least one of a cell monitoring module, a control module, a battery disconnect module, or a motor; and conduits connected to and directing the coolant between the battery pack and the at least one of the cell monitoring module, the control module, the battery disconnect module, or the motor.

In other features, a cooling system is disclosed and includes the battery pack and at least one of a cell monitoring module, a control module or a battery disconnect module disposed on a wall of the battery pack and contacting the coolant in the battery pack.

In other features, a thermal control system is disclosed and includes: a cooling circuit including the battery pack and a swirl pot, where the swirl pot is configured to perform fluid deaeration; a sensor coupled to the swirl pot, the battery pack or another component of the cooling circuit and configured to monitoring a state of the thermal control system; and a control module is configured to detect a thermal runaway event based on an output of the sensor and, perform a countermeasure in response to detecting the thermal runaway event.

In other features, a battery pack is disclosed and includes battery cells and an outer housing. The battery cells include first cells and second cells, where: the first cells are arranged in a first set of rows; the second cells are arranged in a second set of rows; and each of the second set of rows are disposed between and laterally offset from two of the first set of rows. The outer housing is configured to enclose and immerse the battery cells in a coolant, the outer housing including a first wall and a second wall, where: the first wall includes first orifices each of which directing a portion of the coolant to flow in a row-to-row manner from the first wall to the second wall; the second wall is disposed on an opposite side of the battery cells as the first wall and includes second orifices to receive the coolant subsequent to flowing between the battery cells; a first row of the first set of rows is disposed closer to the first wall than the other rows of the first set of rows and closer to the first wall than the second set of rows; and a last row of the second set of rows is disposed closer to the second wall than the other rows of the second set of rows.

In other features, the battery pack further includes a support structure for supporting the battery cells and including dividing members separating the battery cells, where: the battery cells are arranged such that adjacent ones of the first cells are separated by a portion of the support structure and a portion of the coolant and not by one or more of the second cells; the second wall is arranged parallel to the first wall; the first wall is a front wall having an outer planar surface facing in a vehicle forward direction when the battery pack is installed in a vehicle; and the second wall is a back wall having an outer planar surface facing in a vehicle rearward direction when the battery pack is installed in the vehicle.

In other features, a battery pack is disclosed and includes battery cells including first cells and second cells, where: the first cells are arranged in a first set of rows; the second cells are arranged in a second set of rows; and each of the second set of rows are disposed between and laterally offset from two of the first set of rows. The battery pack further includes an outer housing configured to enclose and immerse the battery cells in a coolant. The outer housing includes: a first wall including first orifices each of which directing a portion of the coolant to flow in across rows in a column-by-column manner; and a second wall disposed on an opposite side of the battery cells as the first wall and including second orifices to receive the coolant subsequent to flowing between the battery cells. A first cell of each of the first set of rows and a first cell of each of the second set of rows are disposed closer to the first wall than other cells of the first set of rows and other cells of the second set of rows. A last cell of each of the first set of rows and a last cell of each of the second set of rows are disposed closer to the second wall than other cells of the first set of rows and other cells of the second set of rows.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
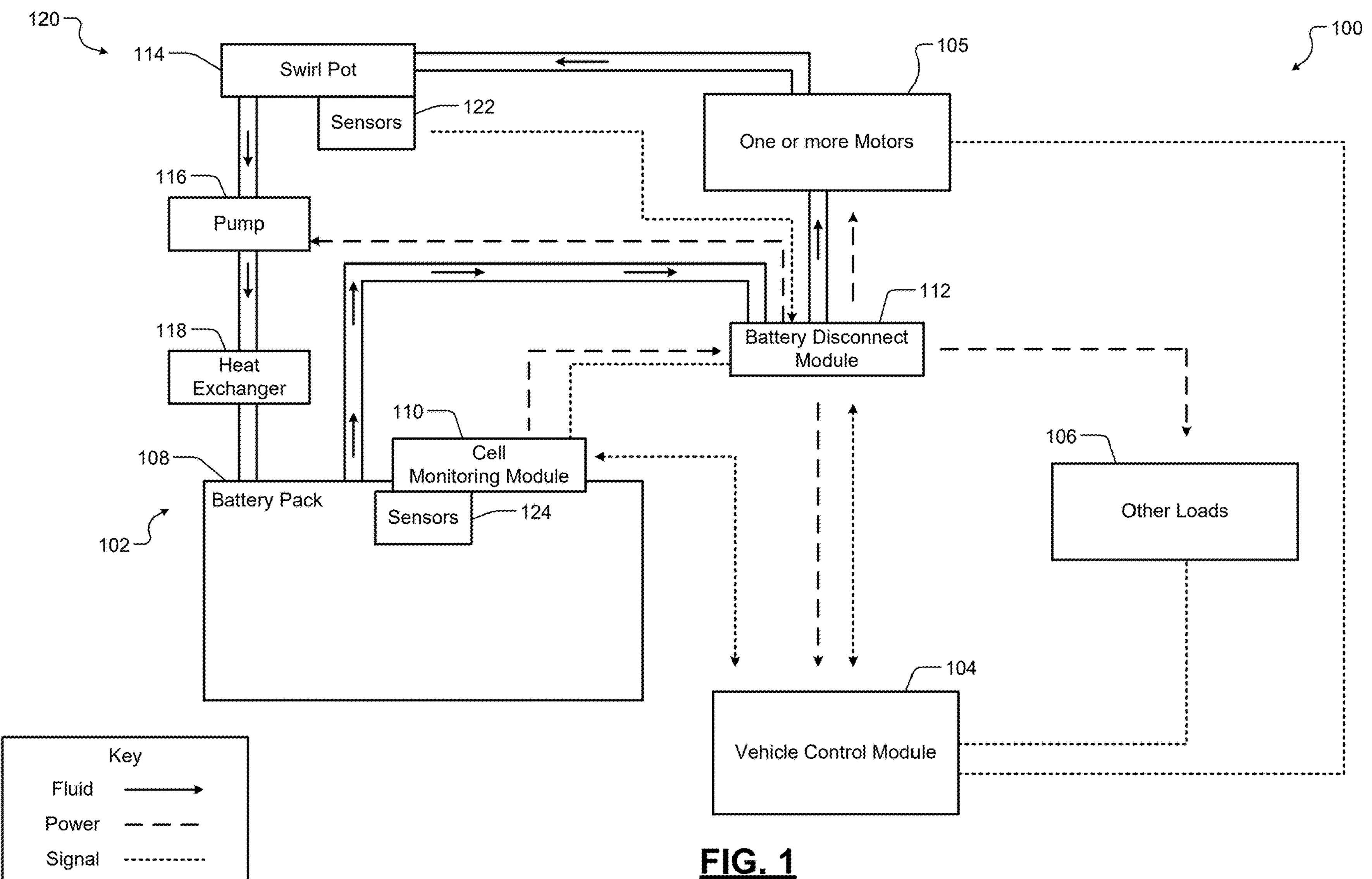
FIG. 1 is a functional block diagram of an example of a vehicle power system including an immersion cooling system in accordance with the present disclosure.

Cooling high power-density battery packs during energy-intrusive conditions such as during direct current (DC) fast-charging events and high-vehicle performance events can be difficult. The high-performance events refer to events during which a large amount of power is quickly and iteratively being discharged and regenerated. Many elements within a battery pack are designed to have (i) low electrical conductivity for electrical isolation which typically also restricts heat flow, and/or (ii) to provide protection by restricting heat transfer during a thermal runaway event. A battery cell can have low conductivity, especially through a stack of cathodes, separators, and anodes, which makes heat removal from the largest surfaces of the battery cell difficult. Battery cells typically have a low maximum temperature to prevent accelerated degradation, which limits the temperature difference required for heat transfer.

Immersion cooling, where the battery cells are directly submerged in a circulated dielectric fluid, can enable high amounts of heat to be carried away from battery cells of a battery pack. Immersion cooling immerses the battery cells in an immersion fluid (or coolant), which maximizes total contact surface area for heat transfer and eliminates many limitations imposed on traditional cold plates and ribbons. Traditional cold plates (planar cooling structures) and ribbons are formed of a metallic material and have a dielectric coating (or outer layer). The cold plates may be disposed below battery cells and are used to absorb thermal energy from the battery cells. The ribbons are wavy bands that extend between and adsorb thermal energy from the battery cells, which are cylindrically shaped. The dielectric coating (or outer layers) of the cold plates and ribbons limit the amount of cooling provided. The cold plates and the ribbons have limited ability to cool battery cells during energy-intensive conditions, which can result in the battery cells increasing in temperature, degrading, experiencing thermal runaway events, and/or having reduced life expectancy.

Examples set forth herein include immersion cooling systems include support structures, planar cooling and distribution structures, splitters, manifolds, and protruding elements that aid in directing flow of an immersion fluid (or coolant) to maximize contact cooling surface area. The planar structures may refer to structures having planar support and/or contact surfaces for supporting and/or contacting, for examples cells and/or buses. This includes control of passive and/or active coolant flow through components internal and external to the battery packs. Cooling circuits are disclosed that circulate coolant between battery packs and components external to the battery packs. In addition, examples are provided for direct contact cooling of modules mounted on battery packs by directing coolant to circulate by and contact exterior surfaces of the modules. The immersion cooling systems improve overall cooling and operating performance, cost and manufacturability of battery packs and components external to and in the same cooling circuits as the battery packs.

FIG. 1 shows a vehicle power system 100 including an immersion cooling system 102, a vehicle control module 104, one or more motors 105, and other loads 106. The immersion cooling system 102 includes a battery pack 108, a cell monitoring module 110, a battery disconnect module 112, the one or more motors 105, a swirl pot 114, a pump 116 and a heat exchanger 118. The pump 116 circulates an immersion fluid (or coolant) through a cooling circuit 120. The coolant is a non-conductive (or dielectric) coolant and provides isolation between adjacent cells of the battery pack 108. As an example, the cooling circuit 120 may include the one or more motors 105, the battery pack 108, the cell monitoring module 110, the battery disconnect module 112, the swirl pot 114 and the heat exchanger 118 and conduits fluidly connecting these components. Although the battery disconnect module 112 is shown separate from the battery pack 108, the battery disconnect module 112 may be attached to or incorporated in the battery pack 108.

Although certain components are shown as part of the cooling circuit 120, other components may be included. The coolant may be circulated through and cool one or more other components. Also, although the cooling circuit components are shown in a certain serially connected order, the arrangement of the components in the cooling circuit may be different from that shown in FIG. 1. For example, the circuit components may be connected in a different order and/or two or more of the circuit components may be connected in parallel. In an embodiment, the heat exchanger 118 is connected between the pump 116 and the battery pack 108 to provide the coolest temperature coolant to the battery pack 108. In another embodiment, the pump 116 is connected between the swirl pot 114 and the one or more motors 105. In another embodiment, the one or more motors 105 are connected between the battery pack 108 and the heat exchanger 118. The heat exchanger 118 may be located near a front grill of the host vehicle.

Figure 2:
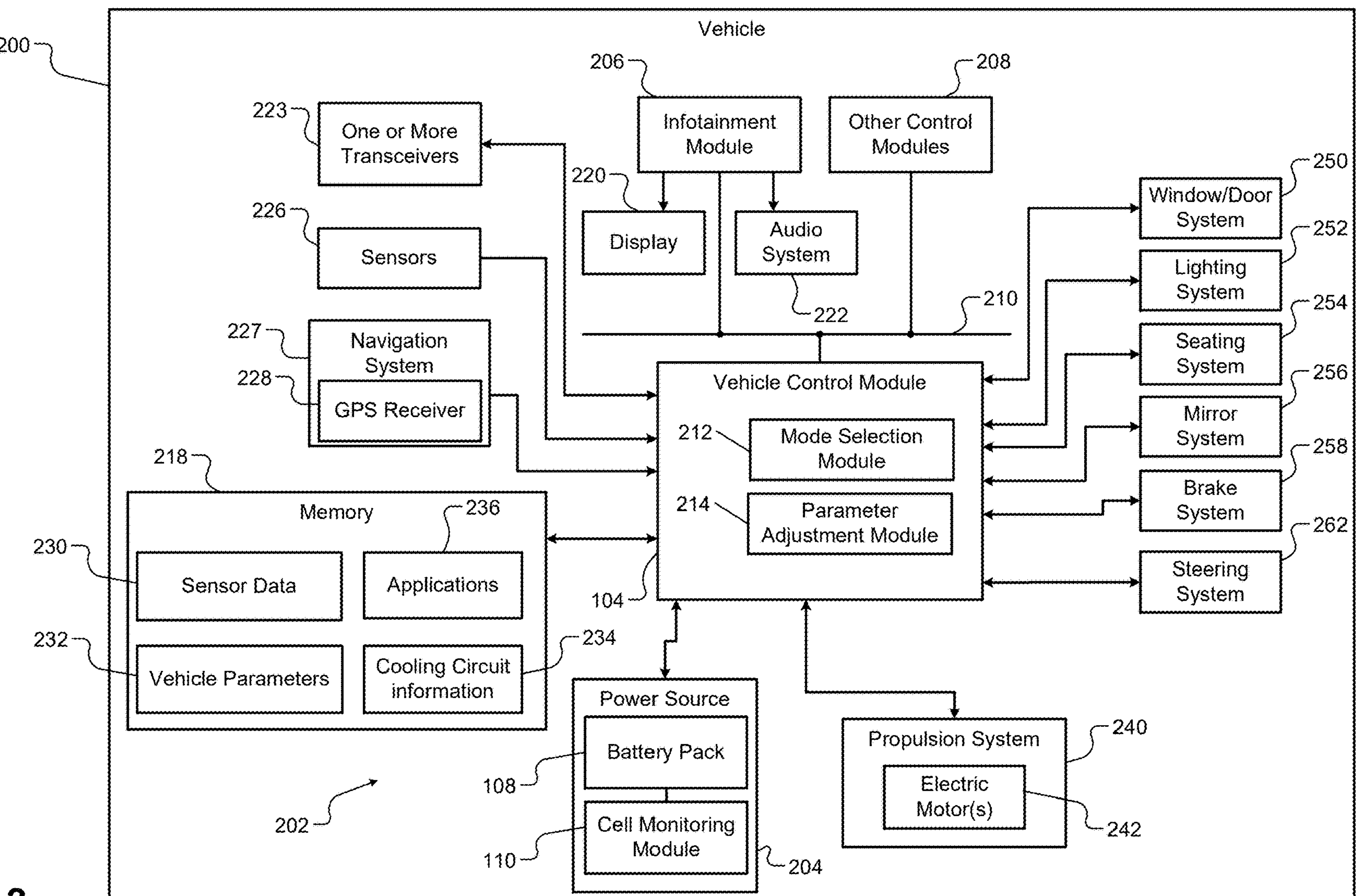
FIG. 2 is a functional block diagram of a vehicle including a power system including a power source with a battery pack in accordance with the present disclosure.

The vehicle control module 104 may be in communication with the modules 110, 112 and control operation of the loads 106. The one or more motors 105 may be used for propulsions purposes and drive one or more wheels of a vehicle. Examples of the loads 106 are shown in FIG. 2 and may include electronic components, devices, and systems including propulsion motors, actuator motors, lighting, navigation devices, infotainment devices, etc. The loads 106 may include high-voltage loads and low-voltage loads.

The battery pack 108 may be configured similarly as any of the battery packs disclosed herein. Some of which are shown in FIGS. 3-11. The battery packs shown in FIGS. 3-11 may be referred to as battery modules. Any number of the battery modules may be included in a battery pack and/or in a battery tray.

The cell monitoring module 110 monitors operation and states of, for example, battery cells of the battery pack 108 and controls operation of the battery pack 108. The cell monitoring module 110 may monitor states-of-charge and temperatures of cells and cell group voltages. The cell monitoring module 110 is responsible for balancing parallel cell groups to make sure that each group has the same voltage by selectively discharging high groups.

The battery disconnect module 112 may, based on the states of the battery cells of the battery pack 108, state of the cooling circuit 120, and/or other states and/or conditions disconnect one or more of the motors 105 and the other loads 106 from receiving power from the battery pack 108. The battery disconnect module 112 may control distribution of power to the motors 105 and the other loads 106. In one embodiment, two or more of the modules 104, 110, 112 are integrated into a single module.

The swirl pot 114 may be disposed at the high elevation point of the cooling circuit 120 and deaerates the coolant. The swirl pot 114 may also regulate pressure in the cooling circuit 120 by for example venting gases when pressure in the cooling circuit 120 exceeds a threshold. The swirl pot 114 may also be a point where the cooling circuit 120 is filled with coolant. Coolant may flow in a circular manner through the swirl pot 114 to remove air (or gas) from the coolant. Sensors 122 may be connected to and/or included within the swirl pot 114. In addition or as an alternative, sensors 124 may be included in the battery pack 108. The sensors 122, 124 may include pressure sensors, chemical species sensors, etc. for detecting thermal runaway events. The species sensors may be used to detect gases, such as carbon dioxide, carbon monoxide, hydrocarbon gas, etc. and/or other gases released during a thermal runaway event. The sensors 124 may also be used for detecting temperatures, voltages, current levels, etc. of the battery cells of the battery pack 108. Any of the modules 104, 110, 112 may monitor the states of the sensors 122, 124 and determine based on this information whether to isolate and/or disable one or more of the battery cells, perform cell balancing, adjust coolant flow rate and/or pressure, and/or perform other operations.

The swirl pot 114 may be used as a central monitoring location to detect a thermal runaway event anywhere within the cooling circuit 120 via pressure monitoring, combustion species detections, and/or monitoring of another parameter. When a thermal runaway event occurs, certain gases are released from one or more cells and a pressure within the cooling circuit 120 increases. These gases and pressure may be detected anywhere in the cooling circuit 120. The gases vented from the one or more cells are released into the coolant. The swirl pot 114 is at the highest location in the cooling circuit 120 and may include a pressure vent for releasing the gases from the cooling circuit 120. Pressure sensing may be used to detect the event since the coolant is incompressible and cell venting produces a fast pressure wave propagation event through the cooling circuit 120, which is detected by, for example, a centrally located pressure sensor. In one embodiment, two pressures sensors are included for redundancy/validation purposes. As an example, one pressure sensor may be located in the swirl pot 114 and another pressure sensor may be located in the battery pack 108. Although pressure, species and/or other sensors may be located at each cell in the battery pack 108, to minimize complexity, mass and costs, a single pressure sensor and gas species sensor may be located in the battery pack 108. In one embodiment, two species sensors are included, one in the swirl pot 114 and another in the battery pack 108.

The heat exchanger (or chiller) 118 draws thermal energy out of the coolant prior to the coolant flowing between and around the battery cells of the battery pack 108.

FIG. 2 shows a vehicle 200 including a power system 202 including a power source 204. The power source 204 includes the battery pack 108 and the cell monitoring module 110. The vehicle 200 may also include the vehicle control module 104, an infotainment module 206 and other control modules 208. The cell monitoring module 110 and the modules 204, 206, 208 may communicate with each other via one or more buses 210, such as a controller area network (CAN) bus and/or other suitable interfaces. The vehicle control module 104 may control operation of vehicles systems. The vehicle control module 104 may include a mode selection module 212, a parameter adjustment module 214, as well as other modules. The mode selection module 212 may select a vehicle operating mode. The parameter adjustment module 214 may be used to adjust parameters of the vehicle 200.

The vehicle 200 may further include: a memory 218; a display 220; an audio system 222; one or more transceivers 223 including sensors 226; and a navigation system 227 including a global positioning system (GPS) receiver 228. The sensors 226 may include sensors, cameras, objection detection sensors, temperature sensors, accelerometers, vehicle velocity sensor, and/or other sensors. The GPS receiver 228 may provide vehicle velocity and/or direction (or heading) of the vehicle and/or global clock timing information.

The memory 218 may store sensor data 230, vehicle parameters 232, cooling circuit information 234 (e.g., battery pack or cooling circuit parameters and/or states), and applications 236. The applications 236 may include applications executed by the modules 204, 206, 208. Although the memory 218 and the vehicle control module 104 are shown as separate devices, the memory 218 and the vehicle control module 104 may be implemented as a single device.

The vehicle control module 104 may control operation of: a propulsion system 240 including electric motors 242; a window/door system 250; a lighting system 252; a seating system 254; a mirror system 256; a brake system 258; and/or a steering system 262 according to parameters set by the modules 104, 110, 206, 208 and/or the cooling circuit information 234. The vehicle control module 104 may set some of the parameters based on signals received from the sensors 226. The vehicle control module 104 may receive power from the power source 204, which may be provided to the motors 242, the window/door system 250, the lighting system 252, the seating system 254, the mirror system 256, the brake system 258 and/or the steering system 262, etc. Some of the vehicle control operations may include starting and/or controlling running operation of the electric motors 242, unlocking doors of the window/door system 250, powering any of the systems 250, 252, 254, 256, 258, 262, and/or performing other operations.

The window/door system 250, the lighting system 252, the seating system 254, the mirror system 256, the brake system 258 and/or the steering system 262 may include actuators controlled by the vehicle control module 104 to, for example, adjust steering wheel angle, throttle position, pedal position, door locks, window position, seat angles, etc. This control may be based on the outputs of the sensors 226, the navigation system 227, the GPS receiver 228 and the above-stated data and information stored in the memory 218.

The vehicle control module 104 may determine various parameters including a vehicle speed, a motor speed, a motor torque, a gear state, an accelerometer position, a brake pedal position, an amount of regenerative (charge) power, an amount of boost (discharge) power, an amount of auto start/stop discharge power, and/or other information, such as priority levels of source terminals of the power source 204, power, current and voltage demands for each source terminal, etc. The vehicle control module 104 may share this information and the vehicle operating mode with the cell monitoring module 110 and/or the battery disconnect module 112 of FIG. 1. The cell monitoring module 110 may determine other parameters, such as: an amount of charge power at each source terminal of the battery pack 108; an amount of discharge power at each source terminal of the battery pack 108; maximum and minimum voltages at source terminals of the battery pack 108; maximum and minimum voltages at power rails, battery cells, modules, etc. of the battery pack 108; SOX values of battery cells and/or modules; temperatures of battery cells and/or modules; current values of battery cells and/or modules; power values battery cells and/or modules; etc. SOX is a generic term for state of charge (SOC), state of health (SOH), and state of power (SOP). The cell monitoring module 110 may determine connected configurations of the battery cells and corresponding switch states as described herein based on the parameters determined by the vehicle control module 104, the cell monitoring module 110 and/or the battery disconnect module 112 of FIG. 1. The above-stated information and parameters may be shared by the modules 104, 110, 112.

Figure 3:
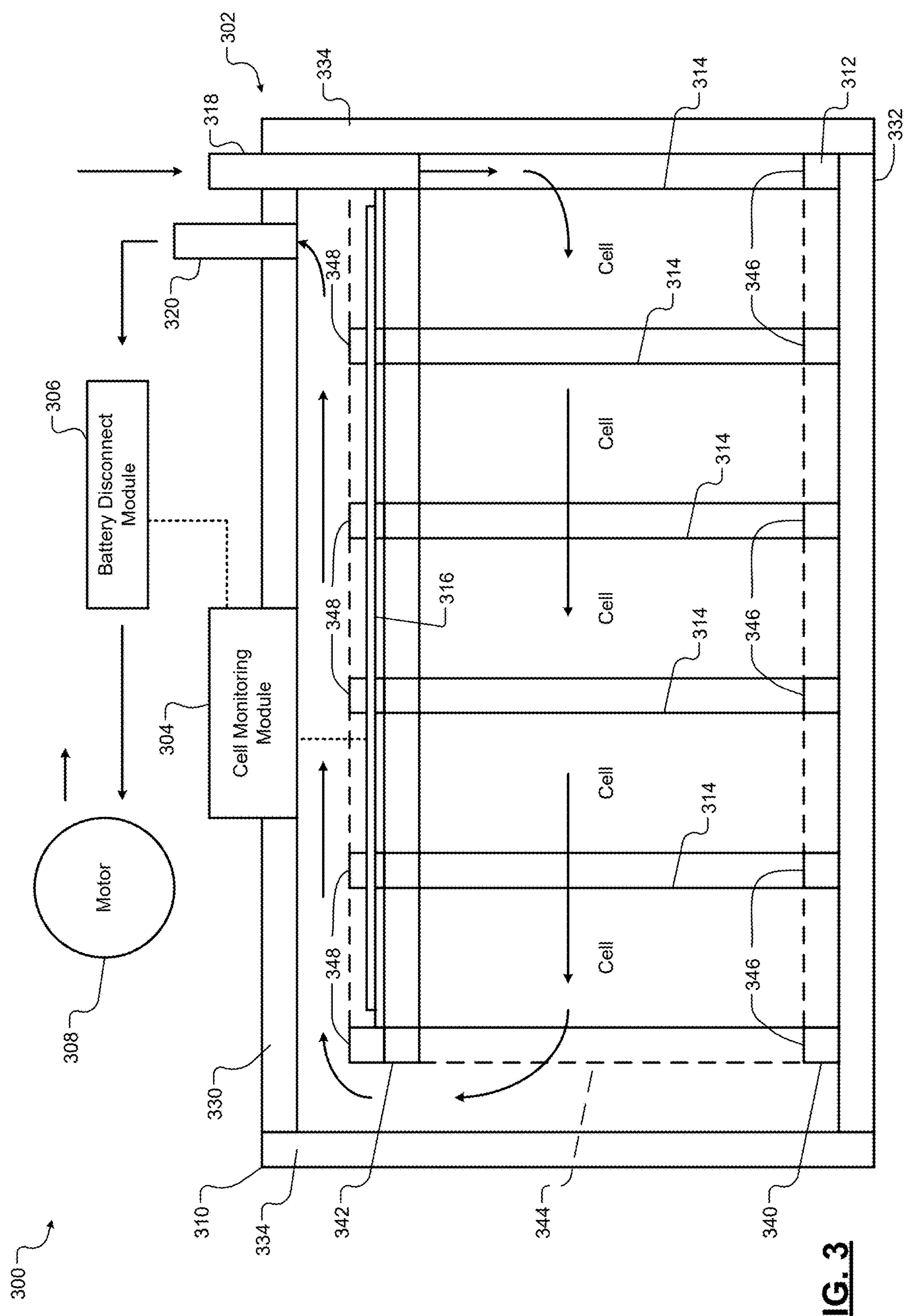
FIG. 3 is a functional block diagram of an example of an immersion cooling system including a side cross-sectional view of a battery pack in accordance with the present disclosure.

FIG. 3 shows an immersion cooling system 300 including a battery pack 302, a cell monitoring module 304, a battery disconnect module 306 and a motor 308. The immersion cooling system 300 may be part of a cooling circuit and/or a larger immersion cooling system, such as that shown in FIG. 1.

The battery pack (or module) 302 includes an outer housing 310, a support structure (referred to as a support frame) 312, battery cells (referred to simply as cells) 314, a electrical bussing 316, an inlet 318 and an outlet 320. The outer housing 310 includes a top wall 330, a bottom wall 332, and side walls 334. The support structure 312 includes a lower matrix support member 340 and an upper matrix support member 342 and may include one or more connecting members 344 extending between the members 340, 342. The matrix support members 340, 342 include dividers 346, 348 that separate the battery cells 314. The battery cells 314 may be "can" cells that are cylindrically-shaped. The support structure 312 holds the cells 314 in place. The cells 314 sit on the lower matrix support member 340. The bus 316 is supported by the upper matrix support member 342, which holds top portions of the cells 314 in place.

Non-conductive immersion fluid (or coolant) fills the outer housing 310 and is passed from the inlet 318 down and then laterally across the cells 314 in a serial manner. The coolant is than directed upward and over the top of the bus 316 to the outlet 320. Arrows show an example direction of coolant flow; other flow patterns may be implemented. The coolant is in contact with the cell monitoring module 304 and the bus 316 and thus cools the cells 314, the cell monitoring module 304 and the bus 316. The bus 316 and other buses referred to herein may be formed of a conductive material, such as copper and/or aluminum and provides connections between the cells 314 and the cell monitoring module 304. Although one bus is referred to with regards to the embodiment of FIG. 3 and some other embodiments, each embodiment may include any number of buses.

Figure 4:
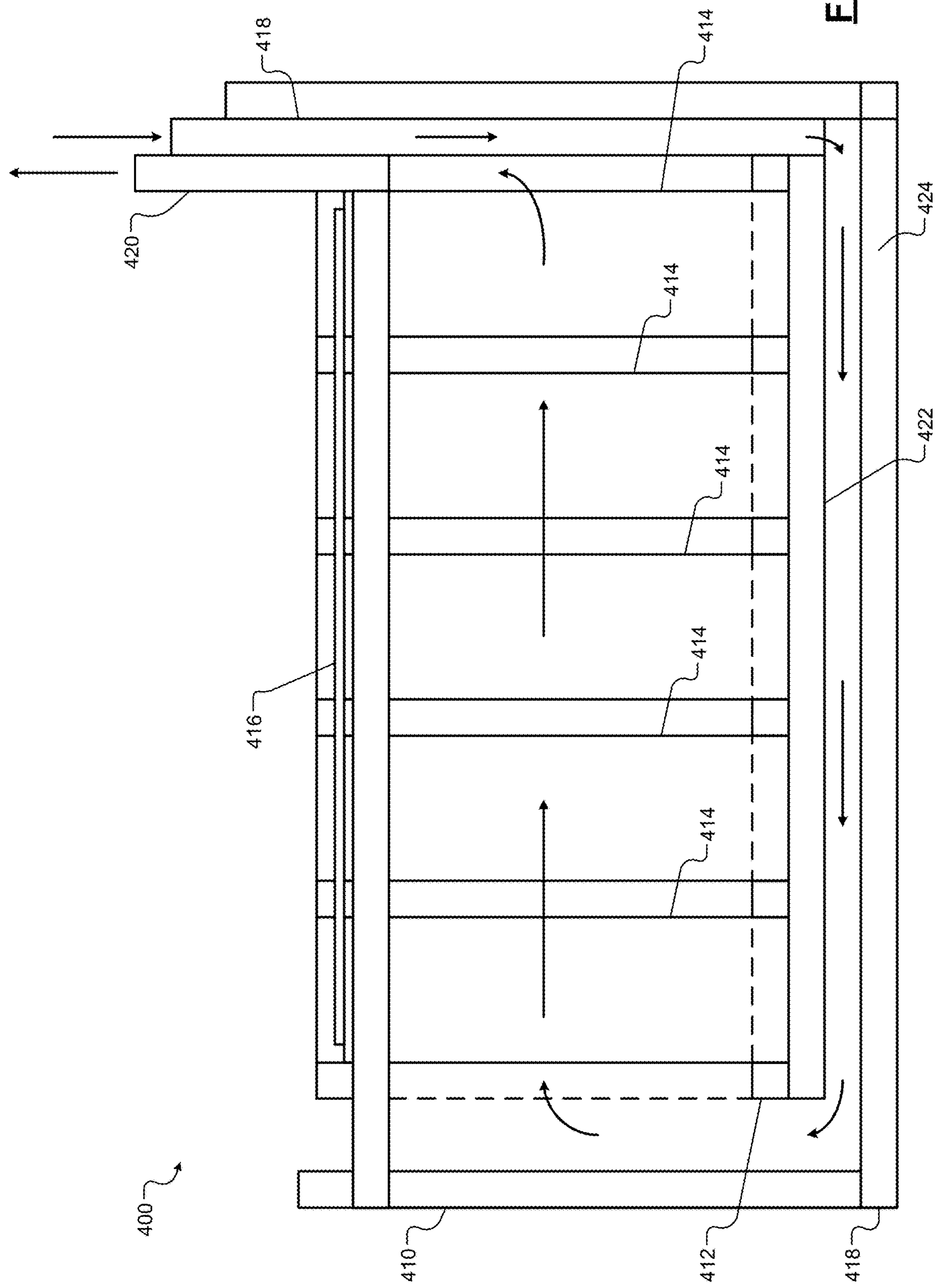
FIG. 4 is a side cross-sectional view of an example of a battery pack including a bottom mounted planar cooling and distribution structure in accordance with the present disclosure.

FIG. 4 shows a battery pack (or battery module) 400 that includes an outer housing 410, a support structure (referred to as a support frame) 412, battery cells (referred to simply as cells) 414, a bus 416, an inlet 418 and an outlet 420. A planar cooling structure (or portion) 422 of the support structure 412 performs in combination with a bottom wall 424 of the outer housing 410 to provide a planar fluid flow passage of non-conductive immersion fluid (or coolant) along the bottom of the support structure 412 in a first direction, up and then laterally between the cells 414 in an opposite direction, as shown. Arrows show an example direction of coolant flow; other flow patterns may be implemented. In this manner, bottoms of the cells 414 is cooled as well as side surfaces of the cells 414. The coolant fills the outer housing 410 and may flow in an opposite direction than shown. In the example shown, the bus 416 is disposed on the top of the outer housing 410 and may be supported by tops of the cells 414. In another embodiment, the cells 414 and the bus 416 are entirely enclosed in the outer housing 410 and contact and are cooled by the coolant.

The arrangement between the planar cooling structure 422 and the bottom wall 424 define cooling flow to ensure module-level flow homogeneity as well as bottom cooling of the cells 414. The coolant is directed to the extremities of the battery pack 400 while cooling the bottoms of the cells 414. Coolant flow then returns around the outside faces of the cells 414 for greater surface contact area to increase heat transfer before returning to the outlet 420, which is located adjacent the inlet 418. The planar cooling structure 422 and/or the like may be located on top of the cells 414 and/or the bus 416 for cooling tops of the cells 414 and/or the bus 416. The inlet 418 may have a single bottom output, as shown, or multiple side hole outputs depending on flow direction of the coolant. Other examples are shown in FIGS. 5-7.

Figure 5:
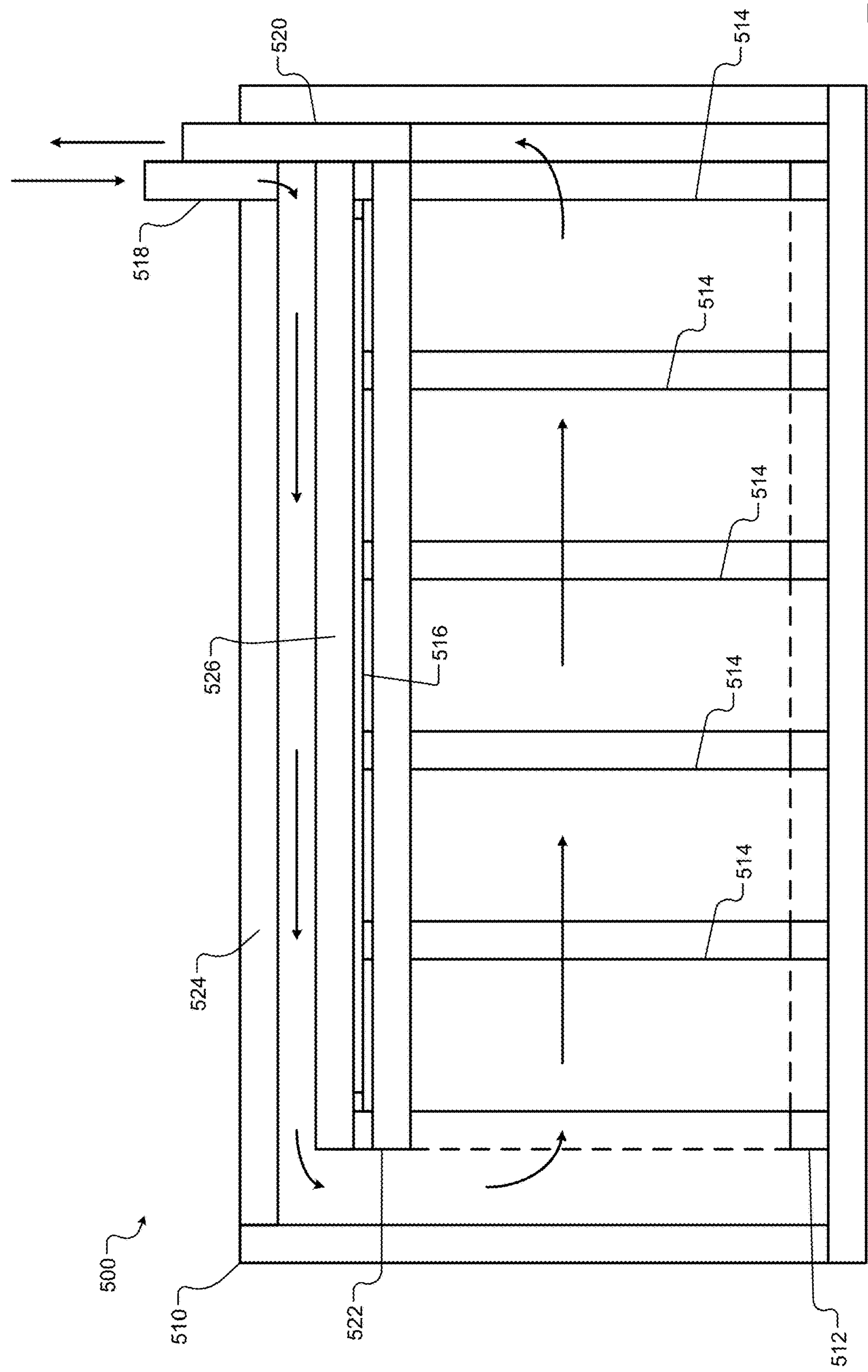
FIG. 5 is a side cross-sectional view of an example of a battery pack including a top mounted planar cooling and distribution structure in accordance with the present disclosure.

FIG. 5 shows a battery pack (or battery module) 500 that includes an outer housing 510, a support structure (referred to as a support frame) 512, battery cells (referred to simply as cells) 514, a bus 516, an inlet 518 and an outlet 520. A planar cooling structure (or portion) 522 of the support structure 512 performs in combination with a top wall 524 of the outer housing 510 to provide a planar fluid flow passage of non-conductive immersion fluid (or coolant) along the top of the support structure 512 in a first direction, down and then laterally between the cells 514 in an opposite direction, as shown. Arrows show an example direction of coolant flow; other flow patterns may be implemented. The portion 522 may include a plate 526, which may be in direct contact with the bus 516 and cool the bus as well as tops of the cells 514. In one embodiment, the plate 526 is not included and the coolant directly contacts the top of the bus 516. The coolant fills the outer housing 510 and may flow in an opposite direction than shown. In the example shown, the bus 516 is disposed on tops of the cells 514 and may be supported by the support structure 512.

Figure 6:
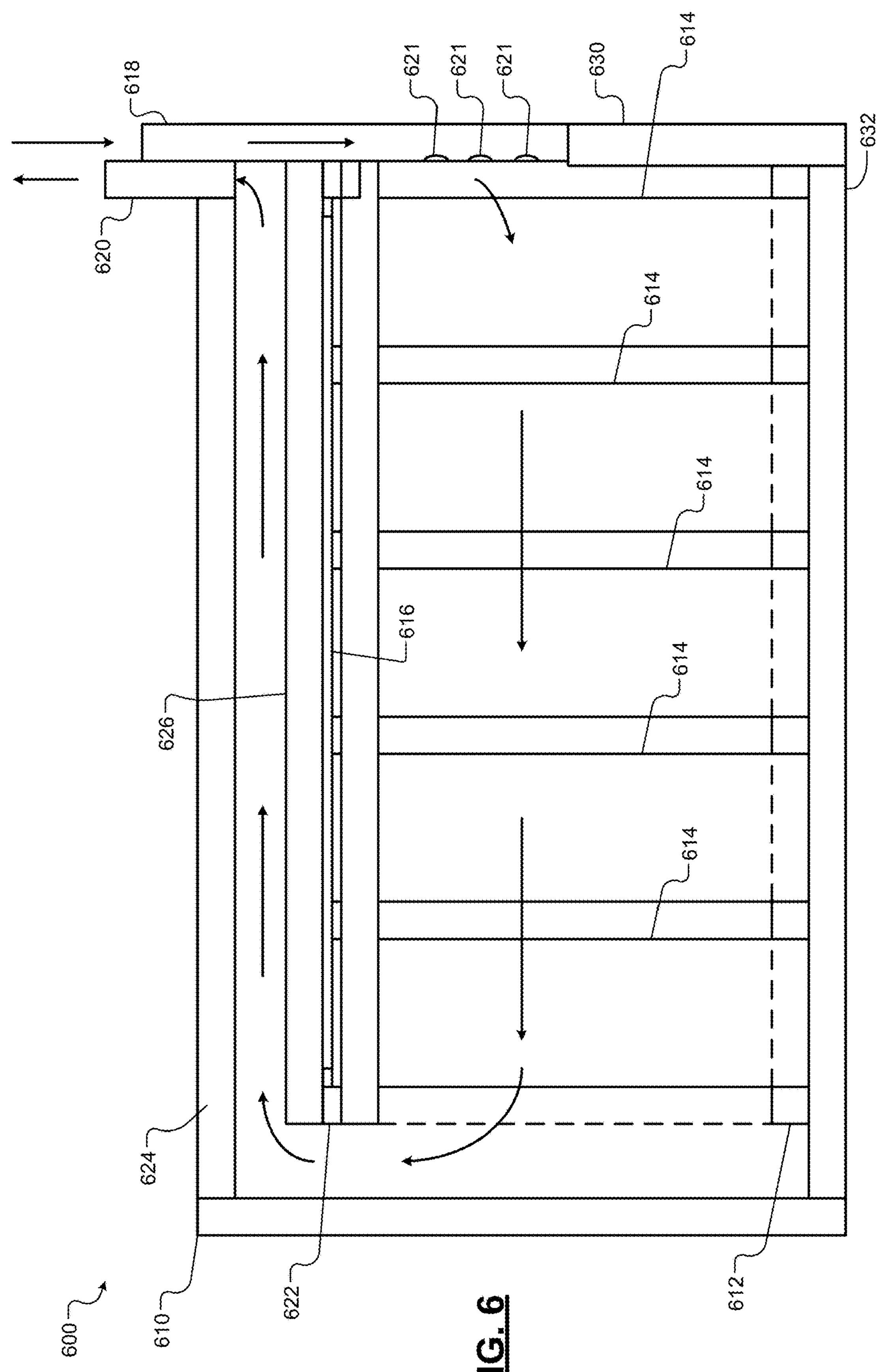
FIG. 6 is a side cross-sectional view of an example of a battery pack including a top mounted planar cooling and distribution structure and an intake with side holes in accordance with the present disclosure.

FIG. 6 shows a battery pack (or battery module) 600 that an outer housing 610, a support structure (referred to as a support frame) 612, battery cells (referred to simply as cells) 614, a bus 616, an inlet 618 and an outlet 620. The battery pack 600 includes the inlet 618 with side holes 621 for directing non-conductive immersion fluid (or coolant) to side surfaces of the cells 614. A plate (or portion) 622 of the support structure 612 performs in combination with a top wall 624 of the outer housing 610 to provide a planar fluid flow passage of non-conductive immersion fluid (or coolant) along the top of the support structure 612. In the example shown, the fluid flows from the holes 621 laterally between the cells 614, up and then in an opposite direction across the top of the support structure to the outlet 620, as shown. Arrows show an example direction of coolant flow; other flow patterns may be implemented. The portion 622 may include a plate 626, which may be in direct contact with the bus 616 and cool the bus as well as tops of the cells 614. In one embodiment, the plate 626 is not included and the coolant directly contacts the top of the bus 616. The coolant fills the outer housing 610 and may flow in an opposite direction than shown. In the example shown, the bus 616 is disposed on tops of the cells 614 and may be supported by the support structure 612. The inlet 618 extends down a side of one of the cells to a sidewall 630, which then extends down to a bottom wall 632.

Figure 7:
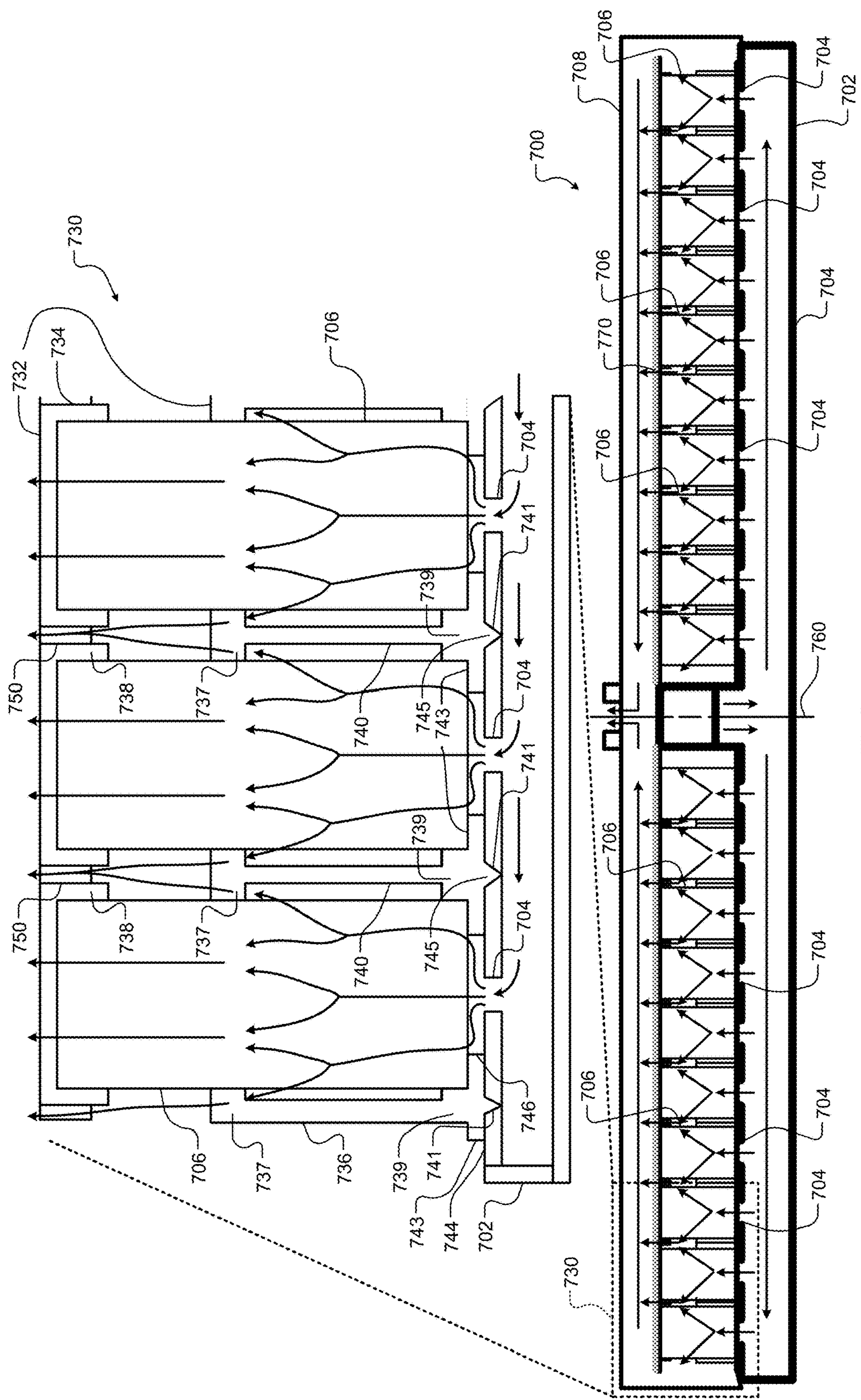
FIG. 7 is a cross-sectional side view of an example of a battery pack including a bottom mounted planar structure implemented as a splitter and illustrating bottom up flow of immersion fluid in accordance with the present disclosure.

FIG. 7 shows a battery pack (or battery module) 700 including a bottom side planar cooling structure 702 implemented as a flow distribution manifold. The planar cooling structure 702 receives non-conductive immersion fluid (or coolant) and includes holes (some of which designated 704) that are centered with bottom surfaces of cells (some of which designated 706). In this example shown, the immersion fluid flows upward through the holes 704 and directed at the cells 706. The immersion fluid flows in an upward direction around sides of each of the cells 706 and contacts sides surfaces of the cells 706. Coolant flows into the planar cooling structure 702, through the holes 704, upward around the cells 706 and then to an upper portion 708 of the battery pack 700 and out the upper portion 708. The upper portion 708 performs as a manifold.

FIG. 7 shows a "close up" portion 730 of the battery pack 700 to further illustrate a corresponding support structure 732 and coolant flow. The support structure 732 includes an upper portion (or matrix) 734 and a lower portion (or matrix) 736. The upper portion 734 includes dividers 738 that extend between the cells 706 and hold top portions of the cells 706 in place. The lower portion 736 includes pillars 740 that extend between the cells 706 from middle hexagonally-shaped dividers 737, which are between middle portions of the cells, down to lower hexagonally-shaped dividers 739. The lower-hexagonally-shaped dividers 739 are above lower structure feet 743. The dividers 737, 739, the pillars 740, and the lower structure feet 743 may be integrally formed as a single component.

Figure 8B:
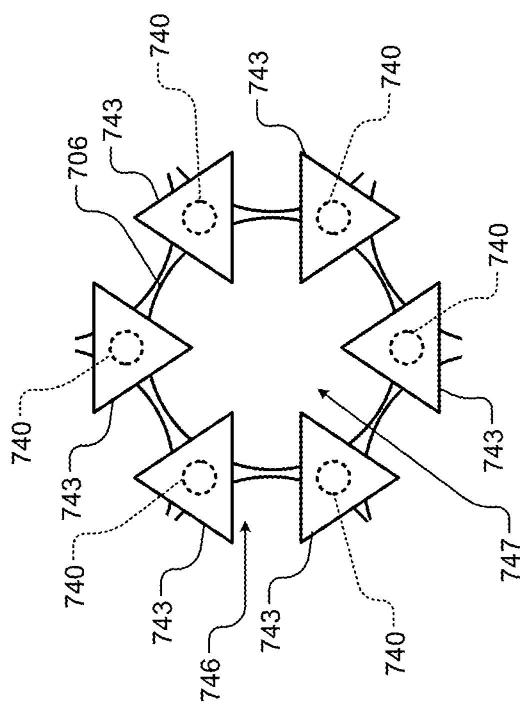
FIG. 8B is a cross-sectional bottom view at section line A-A of FIG. 8A.

The pillars 740 may include protruding members 745 that extend into holes 741 in a bottom planar structure 702. Gaps between the pillars 740 and the cells 706 allow coolant to flow around the cells. The pillars 740 interlock with the planar structure 702. In the shown embodiment, the lower matrix 736 includes the separated lower structure feet 743 that are integrally formed with ends of the pillars 740, as shown. The pillars 740 extend into a top plate 744 of the planar structure 702. The pillars 740 and holes 741 align and center holes 704 of the planar structure 702 to gaps and open area between the lower structure feet 743 (some of the gaps are represented by arrows 746 and the open area are designated as 747, as seen in FIG. 8B) and to centers of bottom surfaces of the cells 706. Coolant passes through the holes 704, around the cells 706, in the gaps 746 and open area 747, and up through holes 750 in the dividers 738 located at least partially between the cells 706.

The holes 704 provide direct fluid impingement on bottom faces of the cells 706 for improved heat transfer coefficient (HTC) and flow balancing. Flow along the sides of the cells 706 provides increased heat transfer from the cells 706 to the coolant. Bottom-to-top flow aids in deaeration of the fluid flow and decreases pumping work because fluid naturally tends to rise with increase in temperature. In an embodiment, the support structure 732 is formed from a plastic material and configured as a matrix for cell positioning, structural supporting and electrical isolating purposes. The support structure 732 may be injection molded in one embodiment. Example views of portions of the matrix are shown in FIGS. 8B-D. Although bottom-to-top coolant flow is shown, coolant may flow in an opposite direction. The support structure 732 also spaces the cells 706 off the planar structure 702 to provide a fluid path and electrical isolation. The support structure 732 is also configured to direct the coolant to flow along the sides of the cells 706 and decrease the flow area to increase fluid flow velocity near the cells 706.

The holes 704 create jets of fluid that impinge directly on the bottom surfaces of the cells 706, increasing HTCs of the bottom surfaces. The sizes of the holes 704 may vary across the battery pack 700. For example, holes closer to the center of the battery pack or planar structure 702 may be smaller than holes further from the center of the battery pack 700 or planar structure 702. The center of the battery pack 700 is shown by centerline 760, which also passes through the center of the planar structure 702. This variance in hole sizes (i.e., diameters and/or cross-sectional area of the holes) aids in providing a more balanced and/or uniform flow of coolant around the cells 706. Coolant flowing out of the center of the upper portion (or manifold) 708 and may be provided to one or more heat exchangers, one or more chillers, one or more pumps, and/or to one or more other components to be cooled.

In the example shown, a bus 770 is disposed on the support structure 732. The upper portion 734 of the support structure 732, which may be connected to or separate from the lower portion 736, provides an insulated member on which to mount the bus 770.

Figure 8A:
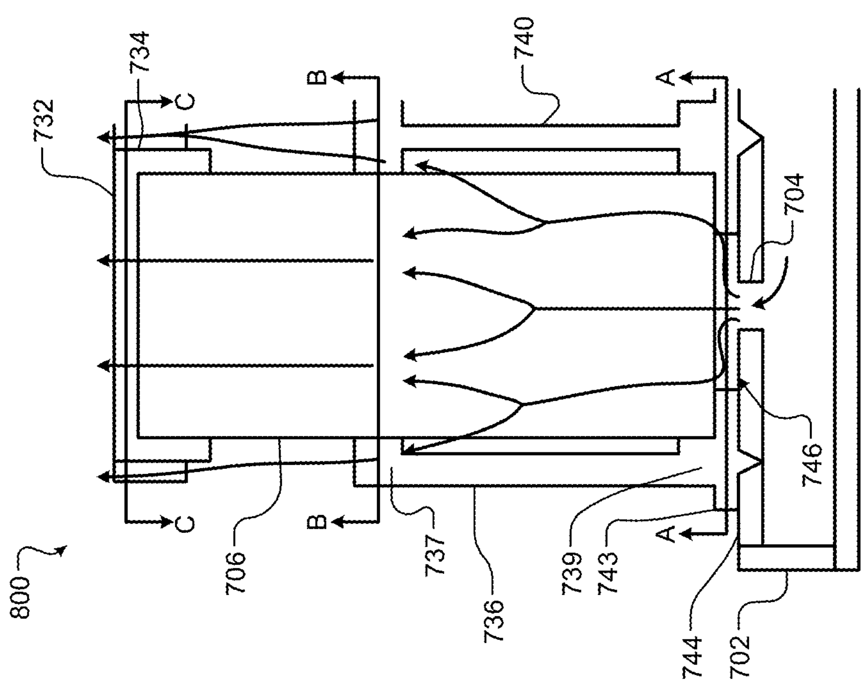
FIG. 8A is a cross-sectional side view of an example of a portion of a support structure, splitter and battery cell of the battery pack of FIG. 7 illustrating orifices of the support structure and the planar structure in accordance with the present disclosure.
Figure 8D:
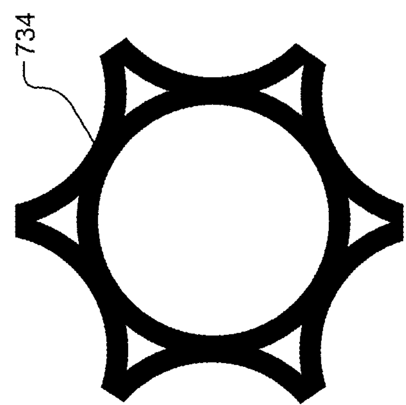
FIG. 8D is a cross-sectional top view at section line C-C of FIG. 8A.
Figure 8C:
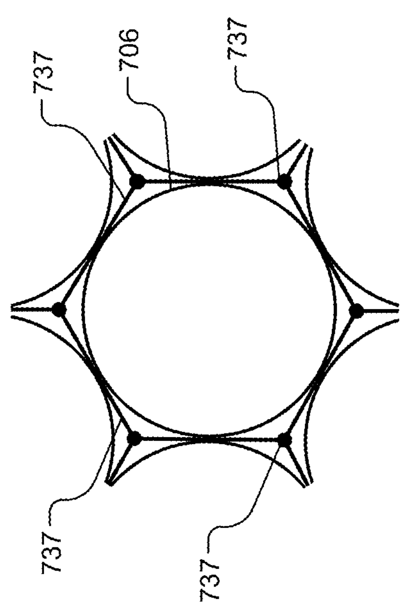
FIG. 8C is a cross-sectional view at section line B-B of FIG. 8A.

FIG. 8A shows a portion 800 of the support structure 732 and the planar cooling structure 702 and one of the battery cells 706 of the battery pack 700 of FIG. 7. FIG. 8B shows a cross-sectional bottom view at section line A-A of FIG. 8A. The lower matrix 736 include the feet 743, which may be triangular-shaped, as shown, and pillars 740 that extend into the top plate 744 of the planar structure 702. The hole 704 is centered between the feet 743 below the cell 706. In FIG. 8B, the hole 704 is shown by a dashed circle to illustrate where the hole 704 is located, but in actuality is not in the cross-sectional view of FIG. 8B. FIG. 8C shows a cross-sectional view at section line B-B of FIG. 8A. The dividers 737 are shown. FIG. 8D shows a cross-sectional view at section line C-C of FIG. 8A. The upper matrix 734 is shown in FIG. 8D.

The pillars 740 include the protruding elements 745 (also referred to as locating features). The locating features ensure alignment and structural integrity when in use. In one embodiment, the lower portion 736 is aligned and disposed on the planar structure 702. The cells 706 are then inserted into the lower portion 736 between the dividers 740. The upper portion 734 of the support structure 732 is then fitted on the cells 706 and may or may not be connected to the lower portion 736. The bus 770 may then be added and connected via conductive elements (e.g., wires) to the cells 706.

Figure 9B:
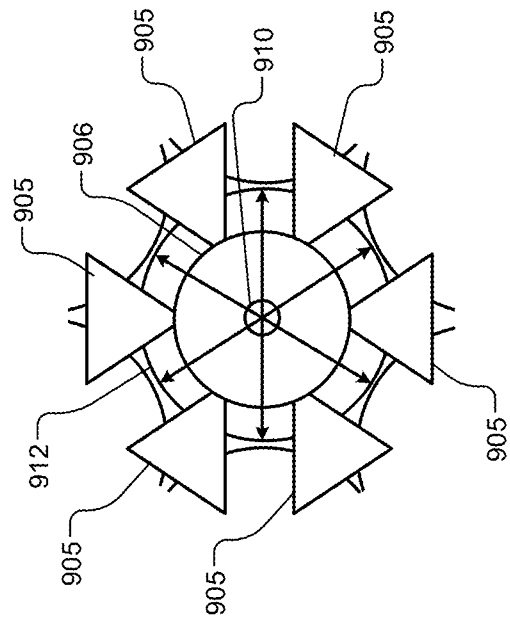
FIG. 9B is a cross-sectional bottom view at section line D-D of FIG. 9A.
Figure 9A:
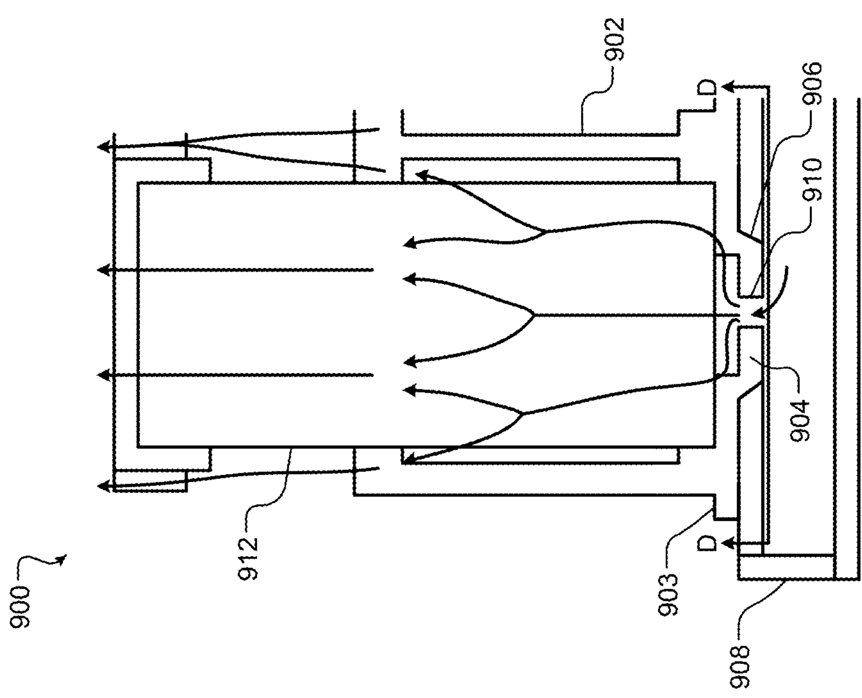
FIG. 9A is a cross-sectional side view of an example of a portion of a support structure, splitter and battery cell of a battery pack illustrating a protruding portion of the support structure in accordance with the present disclosure.

FIG. 9A shows a portion 900 of a support structure 902, similar to the support structure, 732 of FIG. 7. However, the support structure 902 includes a lower matrix 903, which may be integrally formed as part of the support structure 902, with (i) protruding members (one protruding member 904 is shown) that extend into large holes (one hole 906 is shown) of a planar structure 908, and (ii) triangular-shaped feet 905. The protruding members 904 of the lower matrix 903 are placed into the large holes 906. The protruding members 904 includes flow-control holes (one hole 910 is shown) through which non-conductive immersion fluid (or coolant) is passed. The support structure 902 centers battery cells (one battery cell 912 is shown) over the holes 910. FIG. 9B shows a cross-sectional bottom view at section line D-D of FIG. 9A.

Figure 10B:
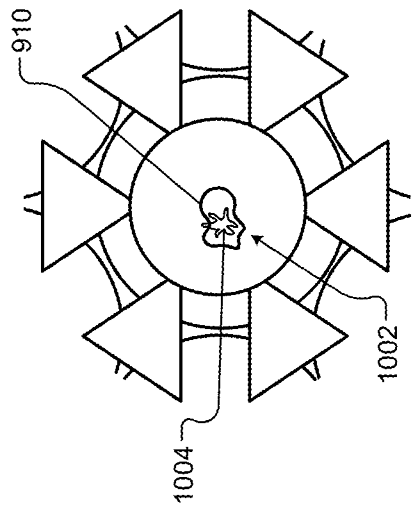
FIG. 10B is a cross-sectional view at section line E-E of FIG. 10A illustrating a melted away area of the support structure.
Figure 10A:
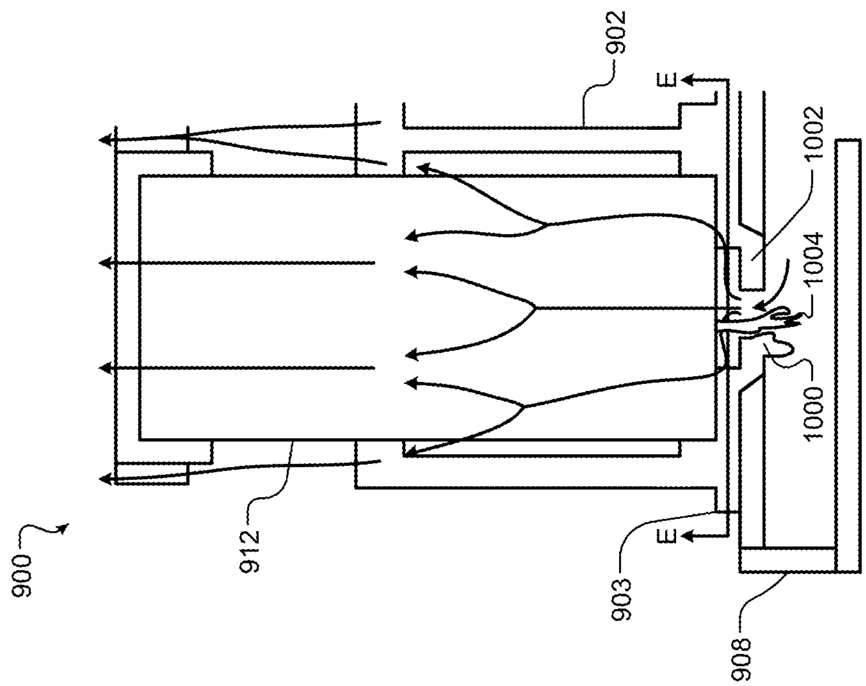
FIG. 10A is a cross-sectional view of the portion of the support structure, the splitter and the battery cell of FIG. 9A illustrating a melted portion of the support structure due to a thermal runaway event.

FIG. 10A shows the portion 900 of the support structure 902 illustrating a melted portion 1000 of the support structure 902 due to a thermal runaway event. FIG. 10B shows a cross-sectional view at section line E-E of FIG. 10A illustrating a melted away area 1002 of the support structure 902. The support structure 902 or lower portions thereof (e.g., the protruding member 1002) is formed of a material (e.g., plastic) having material properties that have a low melting point. The protruding member 1002 provides a flow control orifice that is located in a path of thermal runaway below a cell 912. A gas vent is built into the cell 912 and will open if the cell 912 experiences a thermal runaway event. When it opens, it melts a portion of member 1002, which allows more cooling flow to go to the cell 912 during the thermal runaway event. Hot gases from the cell 912 are designated as 1004. The hot gases 1004 melt away the material and enlarge the hole 910 providing greater immersion fluid flow to the cell 912 to increase cooling of the cell and prevent thermal runaway events from occurring in cells adjacent to the cell 912. This provides a passive implementation for biasing coolant flow to the cell 912 during a thermal runaway event. The hot gases are ejected out of the bottom of the cell 912, directed towards the hole 910 and passed to the coolant, which are then spread into the coolant and cooled by the coolant. The coolant passes through the cell 912 and neighboring cells and returned to, for example, the swirl pot 114 of FIG. 1, where the gases are then able to be released from the corresponding coolant circuit.

Figure 11B:
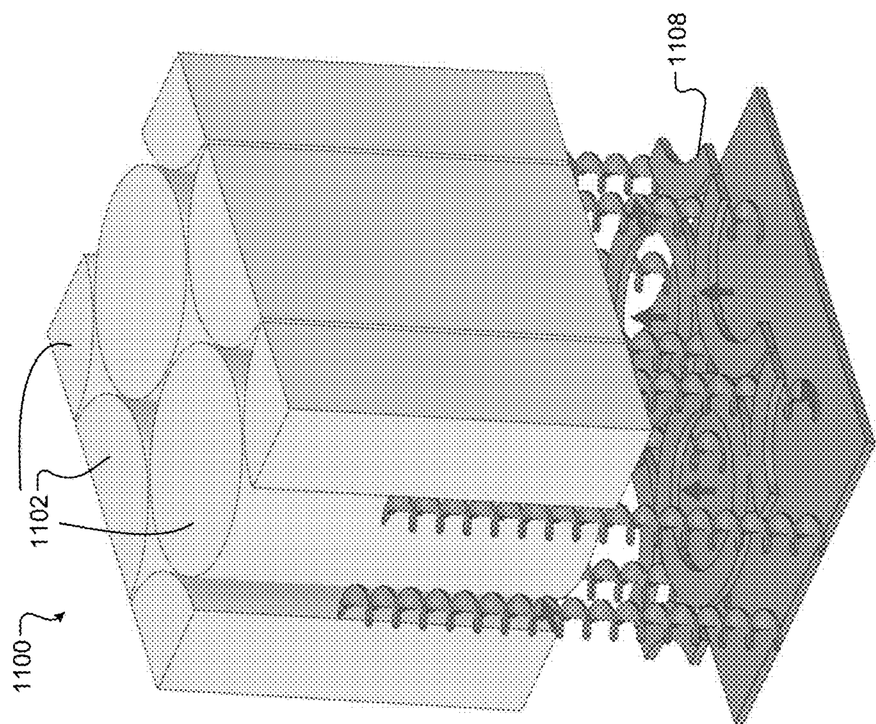
FIGS. 11A-B are perspective views of an example of a portion of a support structure and corresponding battery cells illustrating some protruding elements of the support structure in accordance with the present disclosure.
Figure 11A:
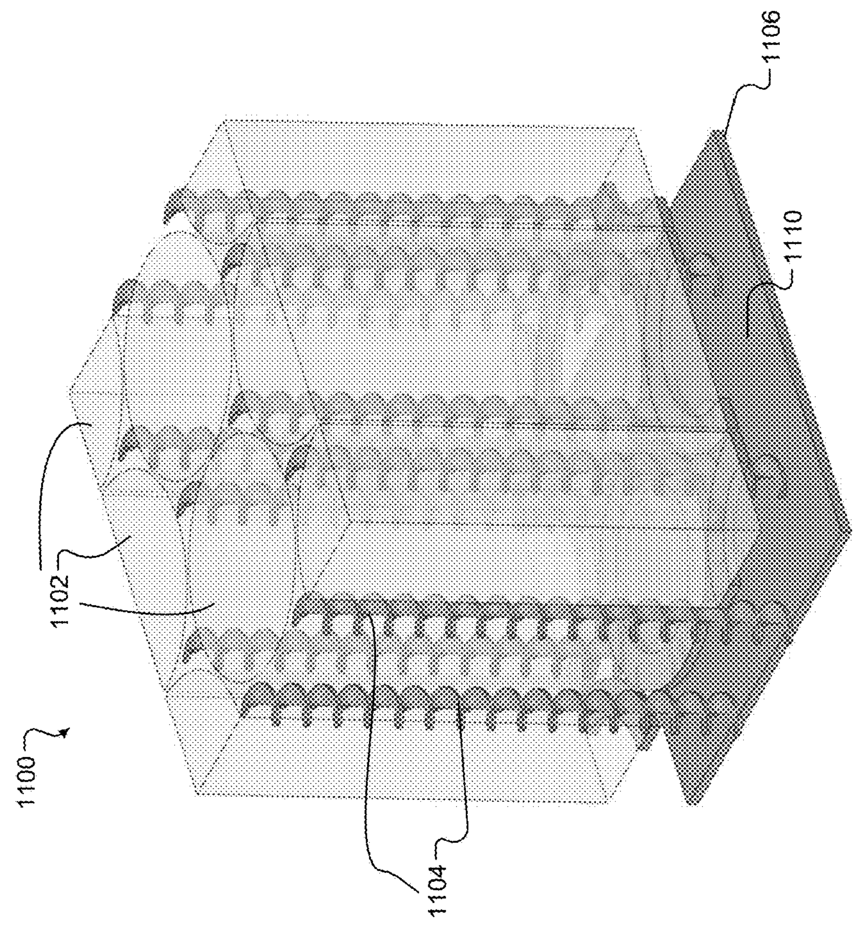

FIGS. 11A-B shows a portion 1100 of a support structure and corresponding battery cells 1102 illustrating some protruding elements 1104 of the support structure that could be implemented as part of the pillars 740 of FIG. 7 or elsewhere. Each of the protruding elements 1104 extend from a lower matrix 1106 of the support structure and in open spaces (or gas) between three adjacent cells 1102. The gaps, in the example shown, are triangular-shaped, where sides of each triangle are curved and match outer dimensions of the cells 1102. Although the protruding elements 1104 are shown as spirals, the protruding elements may be implemented as rods with attached rings, trees with branches, etc. The protruding elements 1104 provide fluid flow resistance and are used to change local fluid flow direction to increase heat transfer coefficients for outside surfaces of the cells 1102 while providing additional structural support and electrical isolation. Tops of the protruding elements 1104 may be attached to an upper matrix. The protruding elements 1104 may be molded with the lower matrix 1106 to form a single part. The lower matrix 1106 may include rings 1108 as shown on which the cells 1102 are disposed. The rings 1108 may be spaced away from a bottom plate 1110. Coolant may pass between the plate 1110 and the rings 1108, up through the rings 1108 and around the cells 1102. Arrows in FIG. 11B show direction of coolant flow. The rings 1108 may be connected to the plate 1110 via support members not shown in FIGS. 11A-11B and/or may be connected to side walls not shown in FIGS. 11A-11B.

Figure 12:
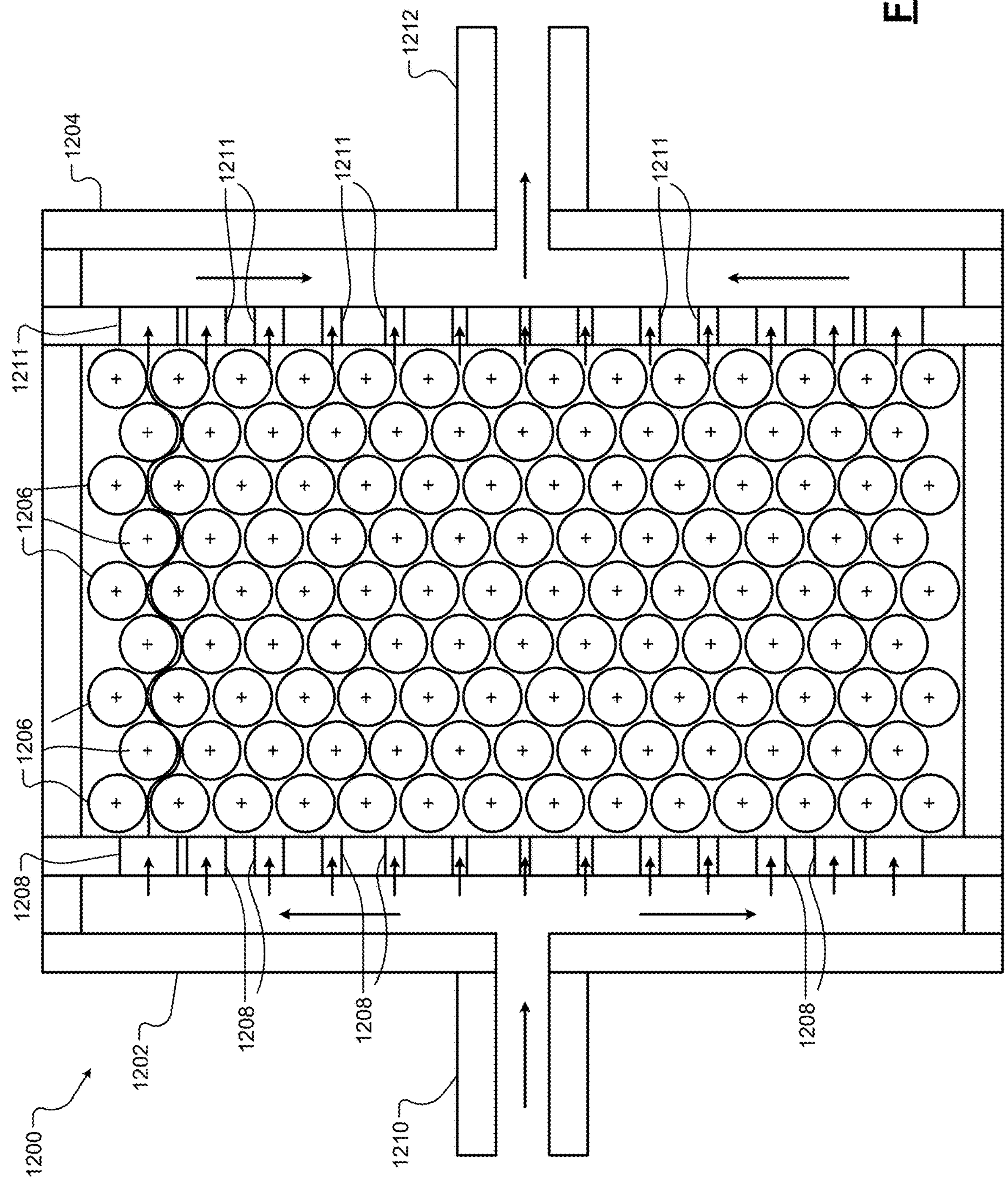
FIG. 12 is a top cross-sectional view of an example of a battery pack including a forward disposed splitter and a rearward disposed manifold for directing coolant between battery cells of the battery pack in a direction parallel to rows of the battery cells in accordance with an embodiment of the present disclosure.

FIG. 12 shows a battery pack 1200 including a forward disposed splitter 1202 and a rearward disposed manifold 1204 for directing coolant between battery cells 1206 of the battery pack 1200 in a direction parallel to rows of the battery cells 1206. The splitter 1202 has holes 1208 that vary in size from a centrally located inlet 1210. The holes 1208 may increase in size the further the holes 1208 are away from the inlet 1210, as shown. The manifold 1204 may have similar holes 1211 and an outlet 1212.

The cells 1206 are arranged in rows and columns, where the rows extend parallel to the splitter 1202 and the manifold 1204 and perpendicular to the direction of immersion fluid flow, which is from the splitter 1202 to the manifold 1204. The rows include first rows that are offset from the second rows to provide a close arrangement of cells. A winding arrow is shown to illustrate direction and flow of the immersion fluid.

The example of FIG. 12 provides fore-to-aft cooling to minimize the number of cells cooled in series. Foremost and aftmost rows of cells are arranged along long surfaces of the splitter and manifold of the battery pack (or battery module). Orifices of the splitter and manifold are sized to control flow distribution. Orientation of the rows of cells affect heat transfer and pressure drop between the inlet and the outlet. Centrally locating the inlet and outlet provides side impact protection.

Figure 13:
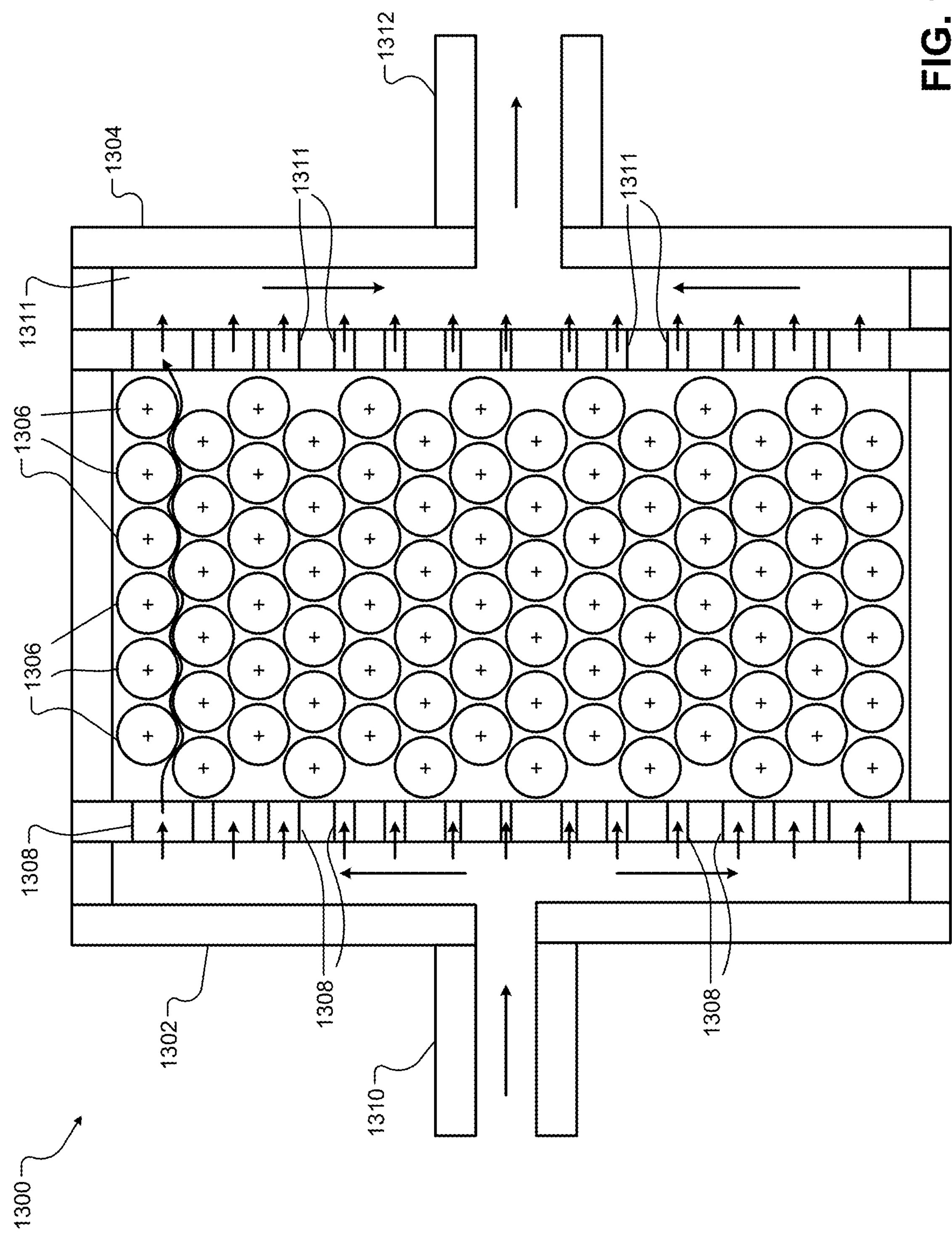
FIG. 13 is a top cross-sectional view of an example of a battery pack including a forward disposed splitter and a rearward disposed manifold for directing coolant between battery cells of the battery pack in a direction perpendicular to rows of the battery cells in accordance with an embodiment of the present disclosure.

FIG. 13 shows a battery pack 1300 including a forward disposed splitter 1302 and a rearward disposed manifold 1304 for directing coolant between battery cells 1306 of the battery pack 1300 in a direction perpendicular to rows of the battery cells 1306. The splitter 1302 has holes 1308 that vary in size from a centrally located inlet 1310. The holes 1308 may increase in size the further the holes 1308 are away from the inlet 1310, as shown. The manifold 1304 may have similar holes 1311 and an outlet 1312.

The cells 1306 are arranged in rows and columns, where the rows extend perpendicular to the splitter 1302 and the manifold 1304 and parallel to the direction of immersion fluid flow, which is from the splitter 1302 to the manifold 1304. The rows include first rows that are offset from the second rows to provide a close arrangement of cells. A winding arrow is shown to illustrate direction and flow of the immersion fluid.

Any of the above-described examples may be combined. Although different battery packs are shown in FIGS. 3-11B having different features, any of the battery packs may be modified to include any of the features of FIGS. 3-13 and/or other features disclosed herein. The battery packs of FIGS. 3-11B may include the features of FIGS. 12-13.

Figure 14:
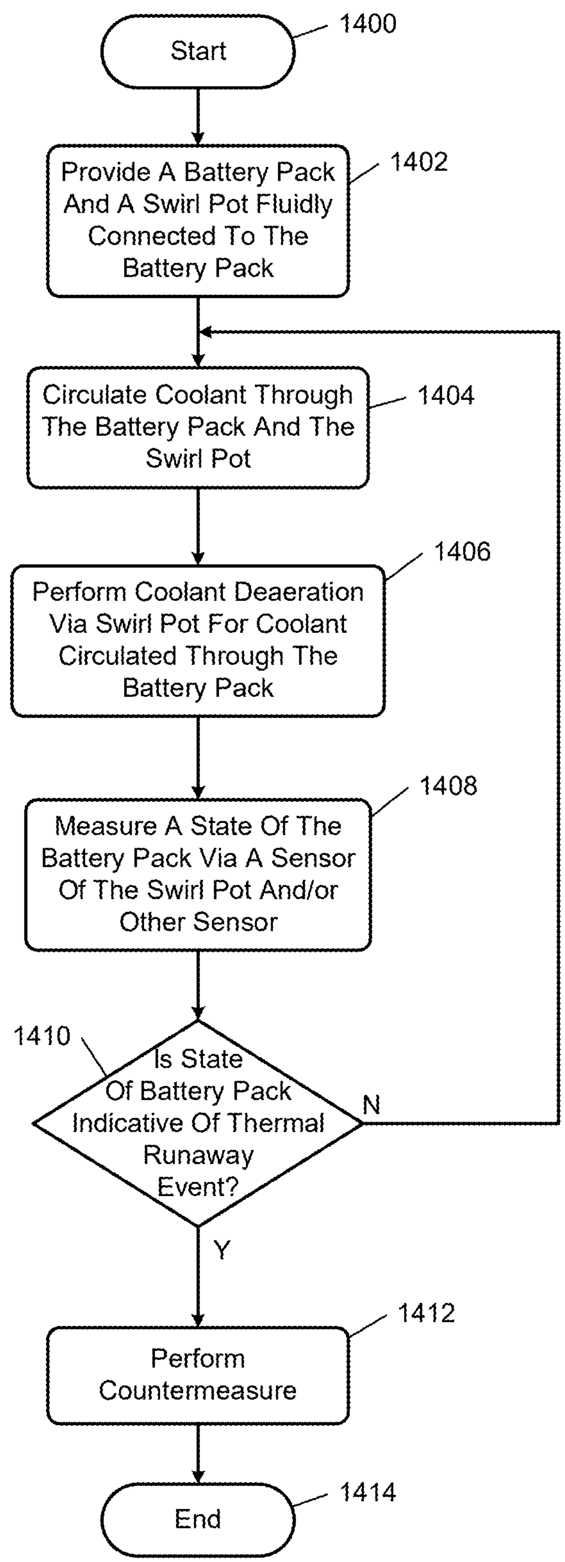
FIG. 14 illustrates a thermal runaway event detection method in accordance with the present disclosure.

FIG. 14 shows a thermal runaway event detection method. The following operations may be iteratively performed. The method may begin at 1400. At 1402, a battery pack (or module), such as any of the battery packs disclosed herein and a swirl pot are provided and connected as described above. Although the following operations 1404, 1406 and 1408 are shown in FIG. 14 as being performed sequentially, operations 1404, 1406 and 1608 may be continuously performed and/or performed in parallel.

At 1404, an immersion fluid (or coolant) is circulated through the battery pack and the swirl pot. This may include circulating the immersion fluid through one or more heat exchangers, one or more chillers, one or more components, etc.

At 1406, the swirl pot performs immersion fluid deaeration. At 1408, sensors, such as the sensors 122, 124 are used to detect a state of the battery pack.

At 1410, one of the modules 104, 110, 112, based on the sensor data, determines the state of the battery pack and whether a thermal runaway event has occurred. If a thermal runaway event has not occurred, operation 1404 may be performed, otherwise operation 1412 may be performed.

At 1412, a countermeasure may be performed in response to detection of a thermal runaway event. This may include generating one or more alert messages via the display 220 and/or audio system 222 of FIG. 2 and/or transmitting one or more alert message to a remotely located central monitoring station or device via the transceivers 223 of FIG. 2. The countermeasures may include driving the host vehicle in a reduced feature mode to a home, a service center, a safe zone, etc. The countermeasures may include isolating, disconnecting and/or not using the cells of concern and/or shutting down one or more systems of the vehicle. The method may end at 1414.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A thermal control system comprising:

a battery pack comprising

- a plurality of battery cells that are cylindrically-shaped and extending vertically,
- an outer housing configured to enclose and immerse the plurality of battery cells in a coolant, wherein the outer housing comprises a plurality of walls including side walls, a top wall and a bottom wall,
- a support structure for supporting the plurality of battery cells, wherein the support structure includes a plurality of dividing members separating the plurality of battery cells, and a planar structure disposed above or below the plurality of battery cells, wherein a gap exists between a planar surface of the planar structure and a planar surface of one of the top wall and the bottom wall of the outer housing for flowing the coolant between the planar structure and the one of the top wall and the bottom wall, the planar structure and at least some of the plurality of walls direct the coolant to flow across and between the plurality of battery cells, and the planar structure and the plurality of walls direct the coolant to flow i) first across tops or bottoms of the plurality of battery cells and then laterally between the plurality of battery cells before exiting the outer housing, or ii) first laterally between the plurality of battery cells and then across the tops or the bottoms of the plurality of battery cells before exiting the outer housing;

a cooling circuit comprising the battery pack and a swirl pot, wherein the swirl pot is configured to perform fluid deaeration;

a sensor coupled to the swirl pot, the battery pack or another component of the cooling circuit and configured to monitoring a state of the thermal control system; and a control module is configured to detect a thermal runaway event based on an output of the sensor and, perform a countermeasure in response to detecting the thermal runaway event.

2. The thermal control system of claim 1, wherein the planar structure and the top wall direct the coolant across tops of the plurality of battery cells prior to or subsequent to flowing between the plurality of battery cells.

3. The thermal control system of claim 1, wherein the planar structure and the bottom wall direct the coolant across bottoms of the plurality of battery cells prior to or subsequent to flowing between the plurality of battery cells.

4. The thermal control system of claim 1, wherein the planar structure is configured as a splitter and receives coolant and splits the received coolant into a plurality of flow paths to direct the coolant around sides of each of the plurality of battery cells.

5. The thermal control system of claim 1, wherein the planar structure directs the coolant to flow vertically between and around each of the plurality of battery cells.

6. The thermal control system of claim 1, wherein the planar structure is configured as a manifold and receives coolant from each of the plurality of battery cells and direct the coolant to the gap between the planar structure and the one of the top wall or the bottom wall.

7. The thermal control system of claim 1, further comprising an electrical bus disposed across and electrically coupled to the plurality of battery cells, wherein:

the support structure is configured to hold the electrical bus; and the support structure is configured to direct the coolant across a surface of the electrical bus.

8. The thermal control system of claim 1, wherein:

the planar structure includes a plurality of holes for passage of the coolant to flow to or from each of the plurality of battery cells;

the support structure includes a plurality of feet, wherein open areas between the plurality of feet are respectively over the plurality of holes for passage of the coolant to flow to or from each of the plurality of battery cells; and gaps between the plurality of feet allow the coolant to flow between the plurality of feet and along sides of the plurality of battery cells.

9. A thermal control system comprising:

a battery pack comprising a plurality of battery cells, an outer housing configured to enclose and immerse the plurality of battery cells in a coolant, wherein the outer housing comprises a plurality of walls including side walls, a top wall and a bottom wall, a support structure for supporting the plurality of battery cells, wherein the support structure includes a plurality of dividing members separating the plurality of battery cells, and a planar structure disposed above or below the plurality of battery cells, wherein the planar structure directs the coolant to flow vertically between and around each of the plurality of battery cells, a gap exists between a planar surface of the planar structure and a planar surface of one of the top wall and the bottom wall of the outer housing for flowing the coolant between the planar structure and the one of the top wall and the bottom wall, the planar structure and at least some of the plurality of walls direct the coolant to flow across and between the plurality of battery cells, the planar structure includes a first plurality of holes for passage of the coolant to flow to or from each of the plurality of battery cells, the support structure includes a second plurality of holes, the first plurality of holes are larger than the second plurality of holes, and protruding members of the support structure are received respectively within the first plurality of holes of the planar structure such that the protruding members reduce sizes of pass through openings in the planar structure from being sizes of the first plurality of holes to being sizes of the second plurality of holes, and as a result restricting the flow of coolant through the planar structure;

a cooling circuit comprising the battery pack and a swirl pot, wherein the swirl pot is configured to perform fluid deaeration;

a sensor coupled to the swirl pot, the battery pack or another component of the cooling circuit and configured to monitoring a state of the thermal control system; and a control module is configured to detect a thermal runaway event based on an output of the sensor and, perform a countermeasure in response to detecting the thermal runaway event.

10. The thermal control system of claim 1, wherein:

the support structure includes a plurality of orifices that are arranged for flow of the coolant to or from the plurality of battery cells; and each portion of the support structure surrounding a respective one of the plurality of orifices is formed of a material that melts during a thermal runaway event of a corresponding one of the plurality of battery cells.

11. The thermal control system of claim 1, further comprising the support structure includes a plurality of protruding elements extending in gaps between the plurality of battery cells.

12. The thermal control system of claim 11, wherein the plurality of protruding elements comprise at least one of spiral-shaped elements, disks, rods, or trees, which provide fluid flow resistance for the coolant flowing through the gaps.

13. A cooling system comprising:

the thermal control system of claim 1; and a pump configured to pump coolant to and from the battery pack, wherein the control module is configured to control the pump to circulate the coolant through the battery pack.

14. A cooling system comprising:

the thermal control system of claim 1;

at least one of a cell monitoring module, the control module, a battery disconnect module, or a motor; and a plurality of conduits connected to and directing the coolant between the battery pack and the at least one of the cell monitoring module, the control module, the battery disconnect module, or the motor.

15. A cooling system comprising:

the thermal control system of claim 1; and at least one of a cell monitoring module, the control module or a battery disconnect module disposed on a wall of the battery pack and contacting the coolant in the battery pack.

16. A thermal control system comprising:

a battery pack comprising a plurality of battery cells, an outer housing configured to enclose and immerse the plurality of battery cells in a coolant, wherein the outer housing comprises a plurality of walls including side walls, a top wall and a bottom wall, a support structure for supporting the plurality of battery cells, wherein the support structure includes a plurality of dividing members separating the plurality of battery cells, and a planar structure disposed above or below the plurality of battery cells, wherein a gap exists between a planar surface of the planar structure and a planar surface of one of the top wall and the bottom wall of the outer housing for flowing the coolant between the planar structure and the one of the top wall and the bottom wall, and the planar structure and at least some of the plurality of walls direct the coolant to flow across and between the plurality of battery cells;

a cooling circuit comprising the battery pack and a swirl pot, wherein the swirl pot is configured to perform fluid deaeration;

a sensor coupled to the swirl pot, the battery pack or another component of the cooling circuit and configured to monitoring a state of the thermal control system; and a control module is configured to detect a thermal runaway event based on an output of the sensor and, perform a countermeasure in response to detecting the thermal runaway event.

17. The thermal control system of claim 1, wherein:

the planar structure is immersed in the coolant and cools the tops or the bottoms of the plurality of battery cells;

the planar structure extends at least one of i) horizontally and ii) perpendicular to a longitudinal end-to-end extending direction of each of the plurality of battery cells; and the plurality of battery cells are disposed on a first side of the planar structure and the coolant flows across a second side of the planar structure opposite the first side.

18. The thermal control system of claim 1, wherein:

the coolant flows i) first across all of the tops or all of the bottoms of the plurality of battery cells and then laterally between the plurality of battery cells before exiting the outer housing, or ii) first laterally between the plurality of battery cells and then across all of the tops or all of the bottoms of the plurality of battery cells before exiting the outer housing; and the direction of coolant flow between the plurality of battery cells is at least one of i) horizontal and ii) perpendicular to a longitudinal end-to-end extending direction of each of the plurality of battery cells.

* * * * *